United States Patent [19]

Parker

[11] 4,076,025

[45] Feb. 28, 1978

[54] SOLAR STEAM BOILER

[76] Inventor: Louis W. Parker, 2040 N. Dixie Highway, Fort Lauderdale, Fla. 33305

[21] Appl. No.: 744,054

[22] Filed: Nov. 22, 1976

[51] Int. Cl.² .............................................. F24J 3/02
[52] U.S. Cl. .................................. 126/271; 126/270; 237/1 A
[58] Field of Search ................ 126/270, 271; 237/1 A

[56] References Cited

U.S. PATENT DOCUMENTS

| 1,951,403 | 3/1934 | Goddard | 126/271 |
| 1,969,839 | 8/1934 | Goddard | 126/271 |
| 2,872,915 | 2/1959 | Bowen | 126/271 |
| 2,920,710 | 1/1960 | Howard | 126/270 X |
| 3,000,375 | 9/1961 | Golay | 126/270 |
| 3,919,998 | 11/1975 | Parker | 126/270 |

FOREIGN PATENT DOCUMENTS

| 1,141,261 | 8/1957 | France | 126/270 |

*Primary Examiner*—Kenneth W. Sprague
*Assistant Examiner*—Larry Jones
*Attorney, Agent, or Firm*—Pollock, Vande Sande and Priddy

[57] ABSTRACT

A solar heater comprising two or more containers nested one within the other for the solar heating of a gaseous medium such as air therein. Each container is provided, near its lower end, with a solar radiation absorbing metal sheet which, when it becomes hot, raises the temperature of the air within the container causing the heated air to rise to the top of the container where it transfers some of its heat to the adjacent container and to the outside air, thereby creating convection currents. The innermost container is provided with a boiler structure positioned to be heated by incident solar radiation to a temperature sufficiently high to convert water within the boiler structure to stem. The boiler structure is of thin flat configuration, is covered by radiation absorbing material on the face thereof which is exposed to solar radiation, has its opposite face polished to a shine, has a number of reinforcing members extending between the opposing faces of the boiler structure, and exhibits surface sections of smoothly curved outwardly bulging convex configuration between the reinforcing members to provide a comparatively light weight boiler structure having adequate strength to withstand the pressure of steam generated therein. In one form of the invention a cylindrical lens is provided to concentrate the sun's rays and superheat the steam obtained from the boiler.

6 Claims, 7 Drawing Figures

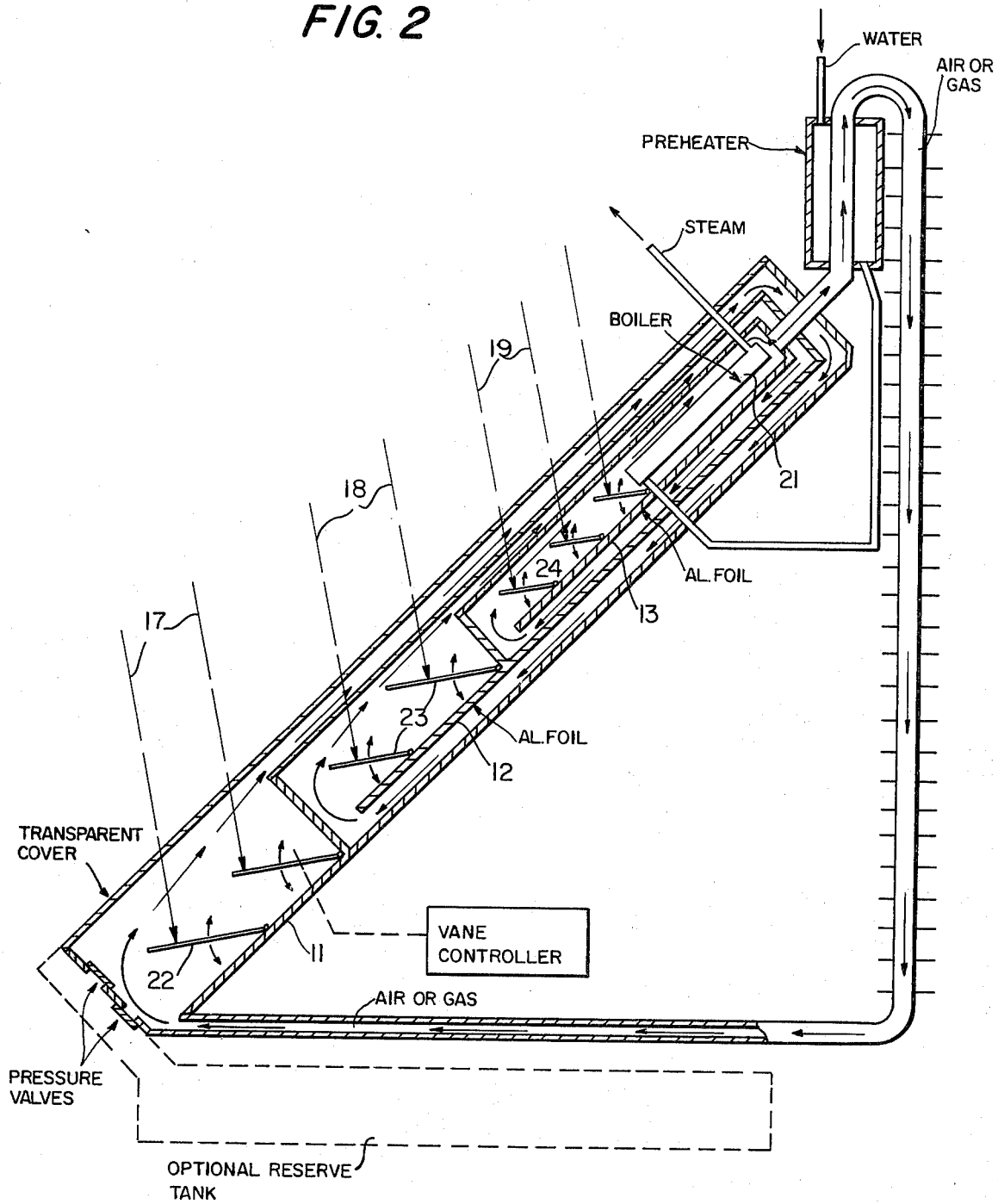

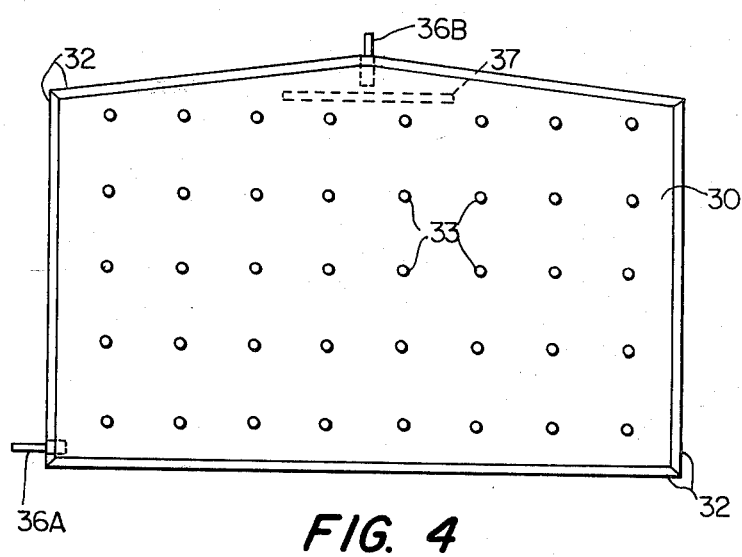
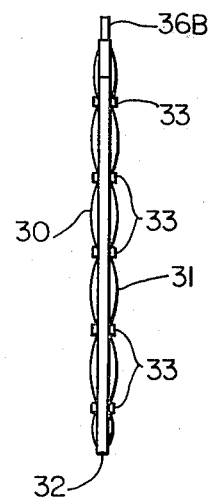
FIG. 4   FIG. 4A
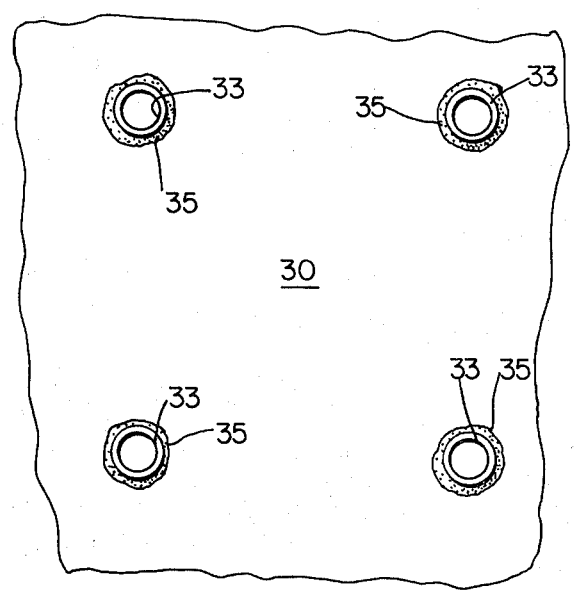
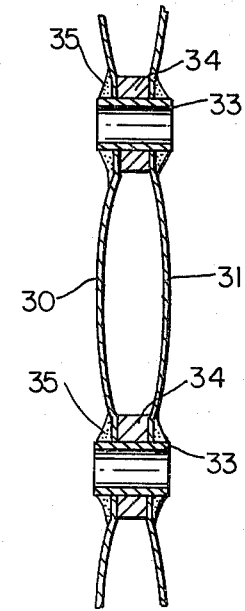
FIG. 5   FIG. 5A

SOLAR STEAM BOILER

BACKGROUND OF THE INVENTION

The present invention is concerned with improved solar heaters of the general type described in my prior U.S. Pat. No. 3,919,998 issued Nov. 18, 1975, for "Convection-Type Solar Heating Unit". The solar heater of my said prior patent is based upon the principle that radiated solar energy falling on an absorbing body, e.g., a steam boiler disposed within the solar heating unit, would heat the boiler to an extremely high temperature if the boiler did not lose heat by re-radiation and conduction. Such conduction and re-radiation is effectively minimized by so arranging various surfaces in the solar heater that they radiate less than they absorb, and the conduction loss which would otherwise occur is eliminated by the use of solar radiation absorbing sheets that heat the air surrounding the boiler to a temperature as high as or higher than the temperature of the heated boiler.

Since the basic structural considerations which should be embodied in a solar heater achieving these results are fully described in my said prior U.S. Pat. No. 3,919,998, the disclosure of said prior patent is incorporated herein by reference. Briefly, the solar heating unit comprises a plurality of containers, i.e., two or more containers, nested one within the other with each of said containers having a gaseous medium, e.g., air therein. The containers respectively have transparent upper surfaces which are superposed and positioned to admit solar radiation to each of said containers. In addition each container houses one or more solar radiation absorbing sheets which transfer heat to the gaseous medium within the container. Various different other surfaces of the containers are coated with heat insulating and with heat reflective materials. The heat radiating sheets are so arranged that convection currents are produced in the gaseous medium within the containers thereby to cause the temperature of the gaseous medium in the innermost container to be raised to a temperature which converts water to steam, and a steam boiler structure is provided within the innermost container to achieve this conversion.

As discussed in my prior patent, the overall efficiency of a solar heating system is measured by the heat units (BTU's) obtainable per dollar invested, and in evaluating the comparative efficiencies of solar heating systems, therefore, the most practical system becomes one that generates the greatest useful energy output per dollar invested. A primary purpose of my prior patented invention was, accordingly, to provide a solar heating system which made use throughout of comparatively inexpensive components and which, moreover, permitted the elimination of auxiliary devices that would increase the cost of the solar heating unit. These cost considerations are equally relevant in respect to the steam boiler itself, for the use of a boiler configuration which is expensive to construct would reduce the overall efficiency of the heating system. Nevertheless, the boiler structure must be of such configuration that it is adapted for incorporation into a solar heating system of the type described, and exhibits adequate strength to resist the very significant internal pressures which are produced as steam is generated. The present invention accomplishes these results and, in addition, provides a number of further improvements which individually and cooperatively improve the overall efficiency of solar heating systems of the general type described in my aforesaid prior patent.

SUMMARY OF THE INVENTION

In accordance with the present invention, a solar heating system comprises two or more containers which are housed within one another and which may have their interiors in gaseous medium flow communication with one another as described in said prior patent or which, instead, have their respective interiors closed off and physicaly separated from one another in respect to the flow of gaseous medium. One or more heat absorbing and radiating plates are located near the lower end of each container to set up convection currents of the air or other gaseous medium within each of said containers. In accordance with one of the improvements of the present invention, the opposite sides of said plates are coated with different materials to cause the top side of each plate to absorb more heat than it will radiate while the backside of each plate transmits its heat to the surrounding gaseous mixtures in each container.

A steam boiler, exposed to solar radiation, is disposed within the innermost container and, in accordance with another of the improvements of the present invention, the side of said boiler which faces the incident solar radiation is coated with a heat absorbing material while its opposite side is polished to a shine thereby to increase heat absorption by, and to reduce heat radiation from, the boiler. In accordance with a still further improvement of the present invention, moreover, the solar heater may be provided with a lens arrangement which operates automatically to focus or concentrate solar energy onto the pipe or conduits carrying the steam generated by the boiler. The lens arrangement and associated conduits are preferably constructed as an integral part of the solar heater, are located at upper end of the solar heater, and function to superheat the steam obtained from the boiler.

The present invention also provides a comparatively low cost solar steam boiler suitable for heating by solar radiation and capable of withstanding a steam pressure in the order of 20 pounds per square inch. The solar steam boiler exhibits higher efficiency than prior art devices inasmuch as the entire surface of the boiler is nearly flat and is substantially completely covered with water on its interior, in contrast to conventional flat plate solar collectors which use spaced tubing sections exposed to the sun for heating water within the tubing.

The boiler structure comprises a pair of comparatively large area metallic sheets which are disposed in spaced, substantially parallel, comparatively closely adjacent relation to one another, said pair of metallic sheets being maintained in this configuration by substantially U-shaped strips which overlie the edges of the metallic sheets and which join corresponding edges of those sheets to one another. The boiler is further characterized by an array of spaced reinforcing members, preferably disposed in a substantially rectangular array, which extend between the metallic sheets at a plurality of spaced locations inward of the edges of said sheets. Each of the reinforcing members is of elongated configuration, is disposed at substantially right angles to the planes of the sheets, and is attached to said sheets at the opposing ends of said reinforcing member. In a preferred embodiment of the invention, each reinforcing member comprises a short metal pipe which is open throughout its length and at its opposing ends, to permit the passage of gaseous medium in the innermost container of the heater through the said hollow pipes from one face to the other of the boiler. Such use of short pipes for reinforcing the boiler also provides greater surface areas than would be provided by rivets to which to solder together the sheets comprising the sides of the boiler.

After the flat metallic sheets, their edge structures, and the intervening pipe reinforcing members are assembled in the configuration described, steam or air under pressure is fed to the interior of the boiler to dilate or expand the metallic sheets at those portions thereof where they are not restrained by the reinforcing members. This operation causes each sheet of the boiler to assume a somewhat bubbly shape, which is maintained after the pressure is released, and which is characterized by adjacent, smoothly curved, outwardly bulging, convex sheet sections. This dilating of the sheet surfaces enlarges the capacity of the boiler very significantly and, in addition, causes the boiler to assume a geometrical configuration which can withstand the greatest internal pressure of all possible geometrical shapes due to the fact that the internal pressure tends to subject the faces of the boiler to a tearing rather than a bending force.

BRIEF DESCRIPTION OF THE DRAWINGS

The foregoing objects, advantages, construction and operation of the present invention will become more readily apparent from the following description and accompanying drawings wherein:

FIG. 2 is a cross-sectional diagrammatic view of a solar heater, of the type described in my prior patent No. 3,919,998, constituting an improved form of the solar heater shown in FIG. 1;

FIG. 4 is a plan view of an improved solar steam boiler for use in the solar heaters of FIGS. 1-3;

FIG. 4A is an edge view of the solar steam boiler shown in FIG. 4;

FIG. 5 is a detail view of a portion of one of the outer surfaces of the solar steam boiler shown in FIG. 4; and FIG. 5A is a detail cross-sectional view of the portion of the solar steam boiler shown in FIG. 5.

DESCRIPTION OF THE PREFERRED EMBODIMENTS

Figure 1:
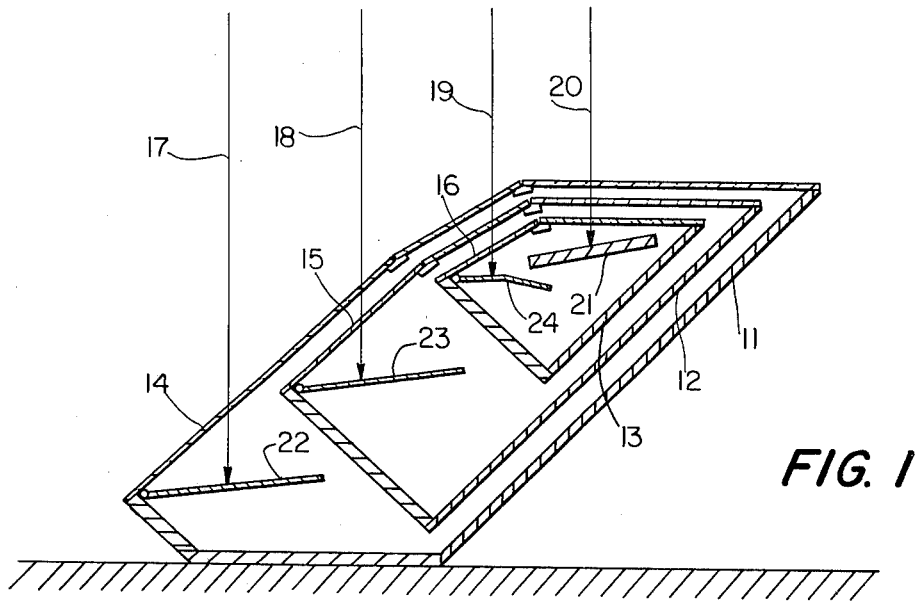
FIG. 1 is an illustrative side view of a basic solar heater constructed in accordance with the present invention.

FIG. 1 depicts the basic form of solar heating unit with which the present invention is concerned. The unit, which in a practical form is of elongated configuration, has a length on the order of 10 feet, is oriented at substantially 45° to the horizontal, and is constructed to produce interior convection currents of air or other gaseous medium.

In the form shown in FIG. 1. (which differs from that shown in my prior patent), the unit comprises three independent, closed wooden boxes or containers 11, 12, and 13 which are disposed in nested relation, one within the other. While three boxes have been illustrated, the principles of the present invention are equally applicable to a solar heating unit which consists of only two, or more than three, such boxes. The side wall and bottom surfaces of the plural boxes ae covered with a heat insulating compound, e.g., material of the type being marketed under the name "Gelcote" (neopenthyl glycol) on top of which is provided a layer of shiny aluminum foil. The upper surfaces 14, 15, 16 of the nested boxes are fabricated of a transparent material, e.g., glass plates, to permit the entry of solar radiation to each box, the sun's rays being designated in FIG. 1 as 17, 18, 19 and 20. A steam boiler 21, acting as a heat absorbing medium, is located near the top of the innermost box 13. In addition, one or more heat absorbing metal plates 22, 23, and 24 are provided in each of the boxes 11, 12, and 13 near their respective lower ends.

In operation, solar radiation enters the several boxes through the transparent upper surfaces 14, 15, 16 to heat metal plates 22, 23, 24. These plates are covered with a selective absorber such as black copper oxide on the sides thereof which are exposed to the sun's rays. The reverse side of the plates 22, 23, 24 are also covered with a blackened material, except that the upper sides contain a selective absorber coating such as copper oxide while the reverse or backside of each plate is covered with ordinary flat black paint. In this way, the top side of each plate 22, 23, 24 will absorb heat directly from the sun's rays, while the backside of each plate will transmit its heat to the surrounding air. The heat absorbed and then radiated by plates 22, 23 and 24 is conducted to the air within the boxes 11, 12 and 13, causing the air within each box to rise to the top of the box where it is cooled slightly, thereby setting up convection currents within each box.

Most of the energy which reaches boiler 21 takes the form of direct solar radiation passing through transparent surfaces 14, 15 and 16. Although boiler 21 receives a very substantial amount of radiated heat, it would, in the absence of other considerations, normally return most of that heat to the atmosphere by conduction and radiation. The separately heated air which surrounds boiler 21, however, prevents most of this conduction since the temperature of the air or other gaseous medium adjacent the boiler is as high as, or higher than, the surface of the boiler. The inside surfaces of the boxes 11, 12 and 13, being covered with shiny aluminum foil, reflect radiated heat rays back to the boiler or back to metal plates 22, 23 and 24, so that the only area where heat radiation is lost is toward the transparent surfaces 14, 15 and 16. Moreover, boiler 21 is preferably covered on its topside with a selective coating such as black copper oxide, while its reverse side is polished to a shine; and heat radiation from the boiler is reduced by the use of this shiny surface.

The general type of solar heater structure shown in FIG. 1 is simple and inexpensive to build, but is nevertheless capable of raising the temperature of water in steam boiler 21 to 212° F or higher, generating steam. This is accomplished through use of the principle that radiated solar energy falling on an absorbing body would heat that body to an extremely high temperature if the absorber did not lose its heat by re-radiation and conduction. The solar heater construction, as described, reduces reradiation by use of selective surfaces that radiate less than they absorb, and reduces conduction loss from the boiler by preheating the air surrounding the boiler to a temperature as high as or higher than that of boiler 21.

An improved but more elaborate and expensive form of solar heater operating in accordance with the foregoing general principles is illustrated in FIG. 2, and is described in greater detail in my aforementioned prior U.S. Pat. No. 3,919,998. Various elements in FIG. 2 which correspond to the elements already described in reference to FIG. 1 have been designated by like numerals.

In the improved form illustrated in FIG. 2, the solar heater comprises a plurality of elongted containers or boxes which, as in FIG. 1, are oriented at substantially 45° to the horizontal and nested within one another, each container having a transparent upper surface positioned to admit solar radiation to the container. In contrast to the independent box arrangement of FIG. 1, however, the FIG. 2 arrangement is such that each container includes an inlet adjacent one end thereof for the admission of a gaseous medium, such as air or some other gas, to be heated by solar radiation within the container, and further includes an outlet for the heated gaseous medium adjacent its other end. The gas outlet of each container is connected to the inlet of the next inner one of the nested containers, and the outlet of the innermost container is connected to the inlet of the outermost container, so that the gaseous medium flows continuously to and through each of the nested containers to cause the gaseous medium to be heated to successively higher temperatures as it flows through the containers in succession. The innermost container 13 can contain a thermocouple junction for the conversion of heat to electricity, but in the form shown in FIG. 2 contains boiler 21 operative to convert water fed to the boiler from a preheater to steam. This improved form of the invention is capable of producing higher temperatures than the form shown in FIG. 1 but is more expensive to produce.

The foregoing comparative brief description is believed to be adequate for purposes of understanding the FIG. 2 arrangement as well as the improvements to be described hereinafter. A more detailed description is set forth in my prior U.S. Pat. No. 3,919,998 which is incorporated herein by reference.

It is well known that the cubic content of steam from a steam boiler can be increased substantially by heating the steam to a temperature well above the boiling point of water. Steam at these higher temperatures acts as an ideal gas, and accordingly doubles its cubic content at each 273 K. increase in temperature whereby greater energy can be extracted from it. Measurements indicate that the arrangement described in my prior U.S. Pat. No. 3,919,998 can generate 20 pounds of steam pressure and a temperature of 260° F. It is possible, however, to increase the temperature of the steam obtainable from my prior patented solar heater considerably higher by use of a cylindrical Fresnel lens which concentrates the sun's rays on a pipe conducting the steam away from the boiler.

Figure 3:
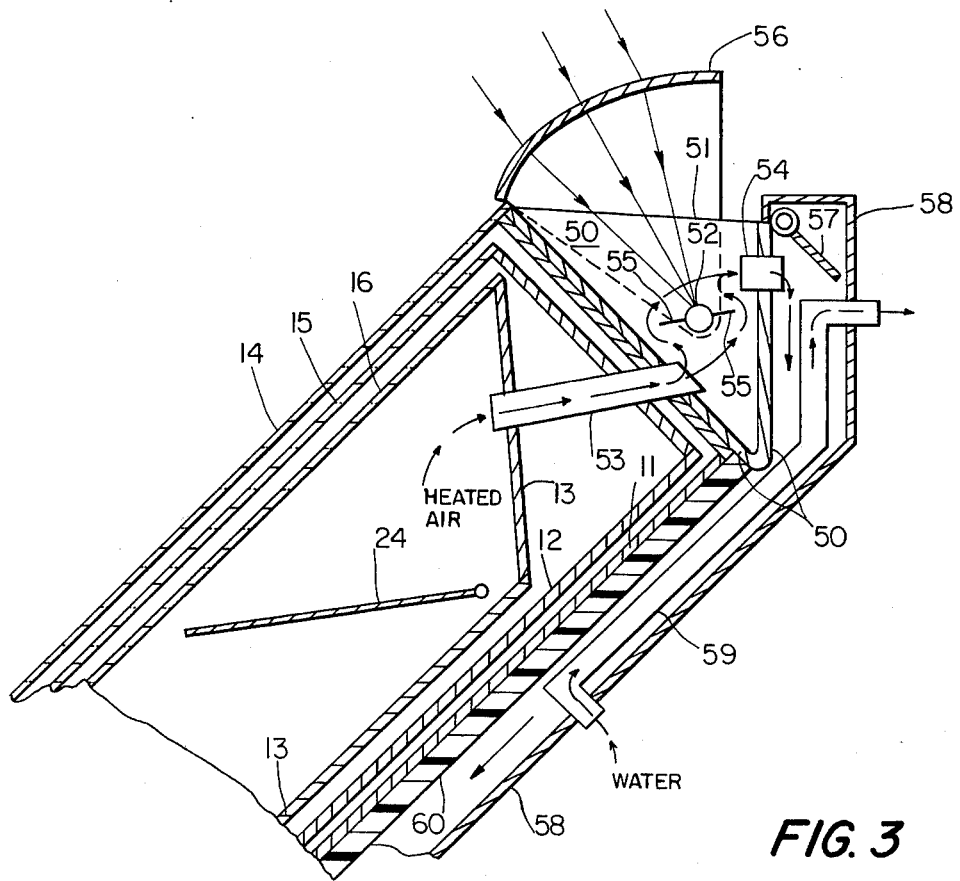
FIG. 3 is a partial illustration of a solar heater of the general type shown in FIG. 1 or FIG. 2, incorporating a cylindrical lens arrangement for super-heating the steam obtained from the boiler.

FIG. 3 is a partial illustration of this improved form of the invention. In FIG. 3 the same numerals are used as on the previous figures to identify like parts. Containers 11, 12 and 13 serve the same purpose as before, but only their upper ends are shown. At the upper end of the nested containers 11-13, a further triangle-shaped container 50 is provided which has a transparent top plate 51 as are employed in the other containers 11-13. A steam pipe 52 connected to the outlet of boiler 21 (not shown in FIG. 3) is disposed within container 50, said pipe 52 extending transverse to the direction of elongation of containers 11-13, i.e., in a direction perpendicular to the plane of FIG. 3 whereby only its cross-section is shown in the drawing. The side of pipe 52 which faces transparent top plate 51 is covered with a black radiation absorbing substance, while the other side is polished to shine.

A cylindrical Fresnel lens 56 is positioned outside of transparent top plate 51 and is arranged to concentrate the sun's rays on pipe 52 thereby to increase the temperature of, or superheat, the steam which is produced by boiler 21 (not shown in FIG. 3) as said steam passes from said boiler through pipe 52 for ultimate utilization. Lens 56 is adapted to be positionally adjusted by automatic means (not shown) to bring its focus onto pipe 52. This adjustment may be effected by any well known means, such as that described by C. P. Gilmore in Popular Science Magazine, October 1976, page 97, and therefore will not be specifically described here.

A pipe 53 conducts hot air from container 13 into container 50, and the hot air thereafter leaves container 50 through a further pipe 54 for circulation via container 58 back to the gas inlet (not shown) at the lower end of outermost container 11 in the manner described in my afore-mentioned prior patent. Fins 55 projecting from each side of steam pipe 52 keep the moving air within container 50 from passing too near pipe 52, which may tend to cool said pipe. These fins are also coated with a radiation absorbent material on both sides thereof since the focal point of cylindrical lens 56 is not sharply defined and some of the focused energy rays fall alongside of pipe 52. A movable shutter 57 disposed adjacent the outer end of pipe 54 enables the air circulation through the solar heater and through container 50 to be shut off at night thereby to prevent rapid loss of heat. Closure of shutter 57 in the evening causes the water in boiler 21 to remain at a higher temperature for use the following morning.

Conduit 58, which conducts the hot air from the outlet end of pipe 54 past the insulated bottom 60 of container 11 to the gas inlet of container 11 for recirculation, is made of metal to radiate the heat of the air within it. A water pipe 59 is located within container 58 so that the water therein is heated by the flow of heated exhaust air surrounding it. This preheated water is used for replacement of the evaporated water in the boiler 21.

In order that the boiler 21 can receive the most radiated energy per square inch, it is necessary that it have a surface which is substantially flat. The cubic capacity of the boiler should, moreover, be comparatively low due to the fact that solar radiation is available for only a few hours during the day, and during this time water in the boiler has to be heated from a comparatively low temperature to boiling in order to obtain steam pressure. These requirements dictate the use, in a solar heater of the type shown in FIGS. 1-3, of a thin flat boiler having the general configuration shown in FIGS. 4 and 4A. However a vessel having a thin flat shape tends to be highly impractical since the vessel must withstand high steam pressures. A boiler having a surface area of 40 inches by 50 inches, for example, must withstand an internal pressure of 40,000 pounds at a steam pressure of 20 pounds per square inch, which is the pressure intended in use. This ability to resist significant internal pressures cannot be accomplished, as a practical matter, merely by the use of heavy materials having adequate strength, for such materials would raise the cost of the boiler to a prohibitive extent particularly when it is recognized that the boiler must be made of a comparatively expensive non-corroding material such as copper.

The improved form of boiler shown in FIGS. 4, 4A, 5, and 5A exhibits the desired comparatively low cost, an ability to withstand steam pressures in the order of 20 pounds per square inch, and comparatively high efficiency due to the fact that the entire surface of the boiler is nearly flat and one of its sides is fully exposed to solar radiation and is completely covered with water on its interior. These desirable results are achieved by an arrangement wherein the surfaces of the boiler are of bubble shape, a configuration which has been found in practice to withstand the greatest pressure of all geometrical shapes, due to the fact that the material of the boiler is subjected to a tearing rather than to a bending force. In addition, the "bubbles" on the surface are so arranged relative to one another that the overall surface exhibits a nearly flat configuration relative to solar radiation. The slight deviations in the surface from a 90° incidence to the impinging rays is made small enough to represent a loss in the order of only one percent according to Lambert's law.

FIG. 4 depicts the solar boiler from the side thereof which is exposed to solar radiation, and FIG. 4A is an edge view of the structure shown in FIG. 4. The boiler comprises two comparatively large area metallic sheets 30 and 31 which are interconnected to one another to form a closed vessel. Corresponding edges of the two sheets 30 and 31 are joined to one another by U-shaped metallic strips 32 which are held in place by soldering. In addition, the boiler is provided with a comparatively large number of spaced reinforcing members 33 which extend between the sheets 30 and 31 at a plurality of spaced locations inward of the edges of said sheets, each said reinforcing member 33 being of elongated configuration disposed at substantially right angles to the planes of sheets 30 and 31, and being attached to said sheets at the opposing ends of each reinforcing member.

The reinforcing members 33 and their mode of attachment to the sheets 30 and 31, is shown in detail in FIGS. 5 and 5A. Each reinforcing member consists of a comparatively short metal pipe which penetrates through both of sheets 30 and 31 via an annular member or washer 34 which is disposed between sheets 30, 31 and which has its opposing ends in engagement with the inner surfaces of said sheets respectively. The opposing ends of each pipe or reinforcing member 33 are located outwardly of the outer surfaces of sheets 30 and 31, as best shown in FIG. 5A, and these outwardly extending ends of the pipes 33 are soldered to the outer surfaces of sheets 30 and 31 by solder joints consisting of substantially annular bodies of solder 35. In order to withstand the forces and temperatures which are encountered in practice, it has been found that the sheets 30 and 31 should constitute copper sheets having a thickness of substantially 0.040 inches, with the solder employed in joints 35 being that available under the name "Silphos" (an alloy of silver and phosphorus). However, other materials such as aluminum alloys may be employed for the sheets 30 and 31, and other suitable solders can also be employed.

The annuli 34 maintain a small gap (about ⅛ inch) between sheets 30 and 31 adjacent each of the reinforcing pipes 33. Pipes 33, in turn, can comprise copper pipes having a diameter of ½ inch. By using components of the types described, a comparatively large area solder joint 35 can be achieved, producing an excellent bond between each pipe 33 and sheets 30, 31 which maintains high rigidity and a greater hold against internal forces which seek to pull sheets 30, 31 apart when steam is generated in the boiler.

A nipple 36a extends through the joined edges of sheets 30, 31 to permit the interior of the boiler structure to be filled with water or other working substance, and a similar nipple 36b extends between the joined edges of the sheets in spaced relation to nipple 36a to provide a steam outlet from the boiler structure. The interior of the boiler is, moreover, provided with a bar-shaped baffle 37 adjacent the steam outlet nipple 36b for inhibiting large bubbles of heated water from shooting into the steam outlet pipe 36b from the interior of the boiler structure.

When the boiler is first assembled in the general configuration described above, the surfaces provided by sheets 30, 31 of the boiler are flat. After assembly, steam or air is fed into the boiler at a pressure of 20 pounds per square inch. This dilates the boiler causing it to assume the bubbly shape shown in FIG. 4A. The copper material chosen for sheets 30, 31 permits the sheets to expand under pressure in the regions between the several reinforcements 33, and to maintain their resultant shape after pressure has been released. This dilation of the sheet surfaces causes the boiler to substantially triple its capacity.

As will be noted in FIG. 4, the array of reinforcing pipes 33 is a substantially rectangular array, but other configurations can be chosen. When the rectangular array is employed, the dilation of the sheet surfaces causes the sheets 30 and 31 to exhibit a smoothly curved, outwardly bulging, convex configuration at each portion of the sheet which is bounded by four of the reinforcing members 33 located respectively at the corners of each rectangle in the rectangular array. This configuration is shown in detail in FIG. 5A. The resultant slight deviations from a truly flat surface, and from a 90° incidence to the impinging solar rays, is sufficiently small to represent a loss in the order of only 1% according to Lambert's law.

As a last operation, the side of the boiler which faces the sun is blackened by application of either a suitable paint or a selective absorber, e.g., black copper oxide. The other side of the boiler is polished to a shine so that it will radiate less heat.

While I have thus described a preferred embodiment of the present invention, many variations will be apparent to those skilled in the art. The foregoing description is accordingly intended to be illustrative only and not limitative of the present invention, and all such variations and modifications as are in accord with the principles described are meant to fall within the scope of the appended claims.

Having thus described my invention, I claim:

1. A solar heater comprising a plurality of elongated containers nested one within the other, each of said containers having a gaseous medium therein, said containers respectively heaving transparent upper surfaces which are superposed and positioned to admit incident solar radiation to the interior of each of said containers, the other surfaces of each container being coated with a heat insulating material superposed by a heat reflective material for reflecting heat toward the interior of said container, at least one heat absorbing and radiating plate located within each of said containers adjacent one end of said container, each of said plates having a face which is exposed to said incident solar radiation and which is coated with a blackened material to cause said plate to absorb heat from said incident solar radiation, the opposite face of each such plate being coated with a blackened material for transmitting heat from said plate to said gaseous medium within said container to cause said gaseous medium to move in a convection current toward the other end of said container, each of said nested containers being constructed to define an interior volume which is completely closed off from the interior volumes of the others of said nested containers whereby the convection current produced within each container is confined to that container, and a steam boiler structure located within the innermost one of said nested containers, said boiler structure being positioned within said innermost container to be heated by solar radiation incident on said boiler structure through said superposed transparent surfaces, the exterior side of said boiler structure which is exposed to said incident solar radiation being coated with a blackened heat absorption material, and the opposite exterior side of said boiler structure being polished to a shine to reduce heat radiation from said boiler.

2. The solar heater of claim 1 including a steam outlet pipe connected to said boiler structure, and optical means for focusing solar radiation on said outlet pipe to further heat steam passing through said outlet pipe.

3. The solar heater of claim 2 wherein said optical means comprises a cylindrical lens, and means for varying the position of said lens to concentrate solar energy on said pipe.

4. A solar heater comprising a plurality of elongated containers nested one within the other, each of said containers having a gaseous medium therein, said containers respectively having transparent upper surfaces which are superposed and positioned to admit solar radiation to the interior of each of said containers, the other surfaces of each container being coated with a heat insulating material superposed by a heat reflective material for reflecting heat toward the interior of said container, at least one heat radiating plate located within each of said containers adjacent one end of said container, each of said plates having a face which is exposed to incident solar radiation and which is coated with a blackened material to cause said plate to be heated by said incident solar radiation, the opposite face of each such plate being coated with a blackened material for transmitting heat to said gaseous medium within said container to cause said gaseous medium to move in a convection current toward the other end of said container, a steam boiler structure located within the innermost one of said containers, said boiler structure being positioned within said innermost container to be heated by solar radiation incident on said boiler structure through said superposed transparent surfaces, the exterior side of said boiler structure which is exposed to incident solar radiation being coated with a blackened heat absorption material, and the opposite exterior side of said boiler structure being polished to a shine to reduce heat radiation from said boiler, a steam outlet pipe connected to said boiler structure, said steam outlet pipe being located within a further container located adjacent one end of said plurality of nested containers, said further container having a further transparent upper surface to admit solar radiation to said further container, the side of said steam outlet pipe which faces said further transparent upper surface being coated with a blackened heat absorption material and the opposite side of said steam outlet pipe being polished to a shine, an optical means for focusing solar radiation on said outlet pipe to further heat steam passing thrrough said outlet pipe, said optical means comprising a cylindrical lens, and means for varying the position of said lens to concentrate solar energy on said pipe.

5. The solar heater of claim 4 including conduit means for the passage of heated gaseous medium from the innermost one of said nested containers into said further container and past said steam outlet pipe, and fin means outstanding from said steam outlet pipe for controlling the flow of said gaseous medium relative to said pipe.

6. The solar heater of claim 5 wherein said fin means are disposed generally in the focal plane of said cylindrical lens, said fin means being coated with a blackened heat absorptive material.

* * * * *